(12) United States Patent
Scelza et al.

(10) Patent No.: US 6,797,200 B2
(45) Date of Patent: Sep. 28, 2004

(54) SELF-EXTINGUISHING CABLE AND FIRE RETARDANT COMPOSITION USED THEREIN

(75) Inventors: Cristiana Scelza, Angellara Di Vallo Della Lucania (IT); Antonio Zaopo, Milan (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 80 days.

(21) Appl. No.: 10/240,099

(22) PCT Filed: Mar. 14, 2001

(86) PCT No.: PCT/EP01/02899

§ 371 (c)(1),
(2), (4) Date: Jan. 7, 2003

(87) PCT Pub. No.: WO01/75907

PCT Pub. Date: Oct. 11, 2001

(65) Prior Publication Data

US 2003/0164483 A1 Sep. 4, 2003

Related U.S. Application Data

(60) Provisional application No. 60/194,395, filed on Apr. 4, 2000.

(30) Foreign Application Priority Data

Mar. 30, 2000 (EP) ............................................. 00106800

(51) Int. Cl.$^7$ ............................................... C09K 21/00
(52) U.S. Cl. ...................... 252/601; 252/609; 252/500; 174/110 SR; 174/110 S
(58) Field of Search ................................ 252/601, 609, 252/252; 174/110 SR, 110 S

(56) References Cited

U.S. PATENT DOCUMENTS 5,698,323 A   12/1997   Keough et al.

6,552,112 B1 * 4/2003 Redondo et al. ............. 524/436

FOREIGN PATENT DOCUMENTS

| EP | 0 629 677 B1 | 12/1994 |
| WO | WO 85/05626 | 12/1985 |
| WO | WO 92/20731 | 11/1992 |
| WO | WO 95/16736 | 6/1995 |

OTHER PUBLICATIONS

Masaki Hasegawa, "Flame–Retarding Composition and Wire and Cable Coated Therewith", Patent Abstracts of Japan of JP 02075642, (Mar. 15, 1990).
Idemitsu Petrochem Co., "Resin Composition Electric Cable Joint Comprise Polypropylene Glass Fibre Magnesium Oxy Sulphate Fibre Acid Modified Polyolefin Option Organic Phosphorus", Derwent Publications of JP 02 247244 A, (Oct. 3, 1990).

* cited by examiner

*Primary Examiner*—Charles Boyer
*Assistant Examiner*—D. G. Hamlin
(74) *Attorney, Agent, or Firm*—Finnegan, Henderson, Farabow, Garrett & Dunner, L.L.P.

(57) ABSTRACT

A fire-retardant composition includes a base polymer composition, including a polymer base material; melamine or a melamine derivative; red phosphorus; magnesium hydroxide or hydrated oxide, aluminum hydroxide or hydrated oxide, or magnesium hydroxide or hydrated oxide and aluminum hydroxide or hydrated oxide; and zeolite. The melamine or melamine derivative includes amounts between 5 and 50 parts-by-weight, inclusive. The red phosphorus includes amounts between 5 and 50 parts-by-weight, inclusive. The magnesium hydroxide or hydrated oxide, aluminum hydroxide or hydrated oxide, or magnesium hydroxide or hydrated oxide and aluminum hydroxide or hydrated oxide includes amounts between 10 and 150 parts-by-weight, inclusive. The zeolite includes amounts between 1 and 5 part-by-weight, inclusive. A self-extinguishing cable, including at least one conductor and at least one coating layer is also disclosed. The at least one coating layer includes the fire-retardant composition.

24 Claims, 2 Drawing Sheets

SELF-EXTINGUISHING CABLE AND FIRE RETARDANT COMPOSITION USED THEREIN

This application is a national phase entry under 35 U.S.C. § 371 from Intentional Application No. PCT/EP01/02899, filed Mar. 14, 2001, in the European Patent Office, the contents of which are incorporated herein by reference; additionally, Applicants claim the right of priority under 35 U.S.C. § 119(a)–(d) based on patent application No. 00106800.6, filed Mar. 30, 2000, in the European Patent Office, the contents of which are incorporated herein be reference; further, Applicants claim the benefit under 35 U.S.C. § 119(e) based on provisional application No. 60/194,395, filed Apr. 4, 2000, in the U.S. Patent and Trademark Office, the contents of which are incorporated herein by reference.

BACKGROUND OF THE INVENTION

1. Field of the Invention

The present invention relates to a self-extinguishing cable and to a fire retardant composition used therein.

Particularly, the invention describes a self-extinguishing cable comprising at least a conductor and at least a conductor-coating layer comprising a fire retardant composition suitable to provide the cable with self-extinguishing properties.

2. Description of the Related Art

The improvement of the characteristics of flame retardant materials is continuously demanded by skilled persons in numerous fields. In particular, there have been prepared materials which, added to organic substances, specifically to per se combustible plastic materials, are suitable to prevent or at least to delay the combustion events, especially the flame propagation when these organic substances are subject either to such high temperatures as to cause their combustion or to the direct action of the flame.

A first solution proposed with the aim of reducing the flame propagation is to add the plastic material with halogenated organic compounds, particularly chlorinated and/or brominated organic compounds, possibly in admixture with antimony oxides, as flame retardant agents. It is believed that such halogenated compounds carry out their action by affecting the radical mechanisms occurring in the gaseous phase during the combustion. Although the resulting compositions show good flame retardant properties, the halogenated flame retardant agents exhibit a number of drawbacks since they partially decompose during the processing of the polymer composition, producing halogenated gases which are toxic for workers and corrosive for the metal parts of the machine tools. Moreover, when they are subject to the direct action of the flame, their combustion produces huge quantities of fumes containing toxic gases. Similar inconvenients are noticed when polyvinylchloride (PVC) added with antimony trioxide as a polymer base is used.

Inorganic charges free from halogens having flame retardant properties, such as metal hydrated oxides or hydroxides, particularly aluminium or magnesium hydroxide, are also known. At high temperatures, these products undergo an endothermic decomposition process which generates water, thus depriving the substrate from the heat and, therefore, slowing the pyrolysis reactions of the plastic material. Nevertheless, such inorganic agents fulfil their task only if they are present in remarkable amounts (generally at least 70–120 parts by weight calculated on 100 parts by weight of the base polymer), though to the detriment of the mechanical properties of the flame retardant composition. Particularly, the values of the elongation and stress at break result sensibly lowered in comparison with the polymer material per se.

Further, other fire retardant systems free from halogens, commonly known as "intumescent systems", have been developed, which, added to a plastic material, are suitable to cause, when combustion occurs, the expansion of the material itself and, at the same time, the formation of an expanded charcoal layer ("char") which prevents oxygen from passing from the outside to the inside, thereby blocking the combustion process for lack of comburent. Besides, the expansion of the plastic material, causing a volume increase, is believed to reduce the emission of flammable gases deriving from the decomposition of the organic substances and, at the same time, to protect the plastic material from the strong thermal irradiation coming from the zone of combustion.

Intumescent systems generally consist of a foaming agent and a dehydrating agent, optionally in the presence of a carbonization agent.

Usually, the foaming agent is a nitrogen compound, for instance urea or melamine, which develops non-flammable gases (particularly nitrogen) and contributes to the formation of char.

The dehydrating agent takes the water away from the substrate under combustion, making the carbonisation thereof easier, and generally consists of phosphorated compounds, for instance ammonium polyphosphates or melamine sulphates or phosphates.

The optionally present carbonization agent substantially contributes to the char formation and usually consists of polyhydroxylated organic substances such as sugars.

Patent application EP-A-0629677 discloses flame retardant compositions free from halogens comprising, in addition to an intumescent system having the characteristics already described, an aluminosilicate, particularly a zeolite.

Also patent application WO 95/16736 discloses compositions comprising a flame retardant substantially free from halogens and wherein the polymer base component consists of styrene polymers substantially free from oxygen. The flame retardant comprises at least one of the following additives: red phosphorus, ammonium polyphosphate, melamine phosphate, pyrophosphate or cyanurate, or resorcinol bis(diphenylphosphate), magnesium hydroxide and a thermoplastic elastomer.

U.S. Pat. No. 5,698,323 describes a further intumescent system free from halogens and antimony, used for making energy or telecommunication cables, which comprises magnesium hydroxide or alumina trihydrate, zinc oxide and red phosphorus; the polymer base component consists of ethylene copolymers with acryl or vinyl esters.

On the basis of the Applicant's experience, the known fire retardant systems show a decreased self-extinguishing ability, when the combustion is repeated. In other words, the efficacy of fire retardant systems tends to be exhausted after the temperature increase caused by the first application of the flame. In fact, such temperature increase can reduce the sample's abilities of self-extinguishing to such an extent as to make the sample combustible again, with obvious undesirable drawbacks.

The technical problem of obtaining a cable endowed with good self-extinguishing properties, also after repeated combustions, without impairing the mechanical properties of the cable, remains therefore still unsolved.

SUMMARY OF THE INVENTION

The Applicant has unexpectedly found that the aforesaid technical problem can be solved by using, for at least one of the conductor-coating layer of the cable, a flame retardant composition comprising a polymer base material in admixture with melamine or a derivative thereof, red phosphorus, magnesium and/or aluminium hydroxyde and a zeolite, in predetermined amounts.

Particularly, the Applicant has found that the self-extinguishing ability of a cable comprising such a fire retardant composition, also upon repeated combustions, turns out to be improved without impairing the mechanical properties of the cable.

The practical importance of the resistance of a cable endowed with such characteristics, i.e. able to resist to subsequent combustions, is apparent in real fire conditions.

In fact, the cable is generally located in an environment wherein it is in contact with other combustible objects, such as plastic raceways, panels, cables of different nature, as well as other objects having self-extinguishing characteristics which can be different from the ones of the cable.

It can therefore happen that the cable endowed with self-extinguishing properties becomes self-extinguished after the first ignition and that, however, being in contact with other objects which are still under combustion, it is found in such conditions that it must be re-ignited. This can be repeated more times and it is therefore apparent that a peculiar system able to self-extinguish after subsequent ignitions has a remarkable practical importance.

According to a first aspect, therefore, the invention concerns a self-extinguishing cable comprising at least one conductor and at least a coating layer comprising a fire retardant composition comprising:

(a) a polymer base material;

(b) melamine or a derivative thereof, in amounts equal to 5–50 parts by weight;

(c) red phosphorus, in amounts equal to 5–50 parts by weight;

(d) magnesium and/or aluminium hydroxide or hydrated oxide, in amounts equal to 10–150 parts by weight;

(e) a zeolite in amounts equal to 1–5 parts by weight;

said amounts being referred to 100 parts by weight of component (a).

Preferably, the polymer base material (a) can be selected from: polyolefins, copolymers of different olefins, copolymers of olefins with esters having ethylene insaturation, polyesters, polyethers, copolymers polyether/polyester, and mixtures thereof.

Examples of such polymers are: high density polyethylene (HDPE) (d=0.940–0.970 g/cm³), medium density polyethylene (MDPE) (d=0.926–0.940 g/cm³), low density polyethylene (LDPE) (d=0.910–0.926 g/cm³); copolymers of ethylene with alpha-olefins having from 3 to 12 carbon atoms (for instance 1-butene, 1-hexene, 1-octene and the like), particularly linear low density polyethylene (LLDPE) and ultra low density polyethylene (ULDPE) (d=0.860–0.910 g/cm³); polypropylene (PP); thermoplastic copolymers of propylene with another olefin, particularly ethylene; copolymers of ethylene with at least an ester selected from alkylacrylates, alkylmetacrylates and vinylcarboxylates, wherein the alkyl group, whether linear or branched, may have from 1 to 8, preferably from 1 to 4, carbon atoms, whereas the carboxyl group, whether linear or branched, may have from 2 to 8, preferably from 2 to 5, carbon atoms, particularly copolymers ethylene/vinylacetate (EVA), ethylene/ethylacrylate (EEA), ethylene/butylacrylate (EBA); elastomeric copolymers ethylene/alpha-olefins, particularly elastomeric copolymers ethylene/propylene (EPR) or ethylene/propylene/diene (EPDM); and mixtures thereof.

Melamine derivatives suitable for implementing the invention can be selected from the inorganic and organic derivatives commonly used in the art such as, for instance, guanamines or melamine phosphates (phosphate, pyrophosphate, etc.), borate, sulphate, cyanurate.

In this description "zeolite" is meant to indicate a natural or synthetic hydrated aluminosilicate having an open tridimensional crystal structure, wherein water molecules reversibly insert.

Particularly, zeolites can be represented by the following formula:

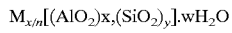

$$M_{x/n}[(AlO_2)_x(SiO_2)_y]\cdot wH_2O$$

wherein

M represents an alkali or earth-alkali metal cation, tetralkylammonium, preferably sodium or calcium;

x, y and w are integer numbers, the y/x ratio being a number greater than or equal to 1;

n is the cation valence, preferably 1 or 2.

According to a preferred aspect, the cable of the invention has amounts of components (b), (c), (d) and (e), always referred to 100 parts by weight of component. (a), of 10–30, 10–30, 20–100 and 1,5–3 parts by weight, respectively.

According to another aspect, the invention further concerns a fire retardant composition comprising:

(a) a polymer base material;

(b) melamine or a derivative thereof, in amounts equal to 5–50 parts by weight;

(c) red phosphorus, in amounts equal to 5–50 parts by weight;

(d) magnesium and/or aluminium hydroxide or hydrated oxide, in amounts equal to 10–150 parts by weight;

(e) a zeolite in amounts equal to 1–5 parts by weight;

said amounts being referred to 100 parts by weight of component (a).

The fire retardant composition according to the invention can be prepared by mixing the polymer components with additives according to techniques known in the art. The mixing can be carried out, for instance, by an internal mixer of the tangential (Banbury) or copenetrating rotor type, or by continuous mixers of the Ko-Kneader (Buss) type or of the co-rotating or counter-rotating double-screw type. The flame retardant compositions of the invention are preferably used in a non cross-linked form aiming at obtaining a coating having thermoplastic properties and therefore recyclable. It is also possible to carry out a total or partial cross-linking of the compositions of the invention according to known techniques, particularly by adding a radical initiator, for instance an organic peroxide.

The compositions of the invention can be used therefore to directly coat a conductor, or to make an external sheath on the conductor previously coated with at least an insulating layer. The coating step can be carried out for instance by extrusion. In case at least two layers are present, the extrusion can be carried out in several separate steps, for instance by extruding, in a first step, the internal layer on the conductor and, in a second step, the external layer on the internal one. Advantageously, the coating process can be made in one step, for instance by the "tandem" technique, wherein different single extruders, arranged in series, are used, or by co-extrusion with a single multiple extruding head.

BRIEF DESCRIPTION OF THE DRAWINGS

Further particulars will be set forth in the following detailed description, taking by reference the accompanying drawings, in which.

DETAILED DESCRIPTION OF THE EXEMPLARY EMBODIMENTS

"Low voltage" generally means a voltage lower than 5 kV, preferably lower than 2 kV, more preferably lower than 1 kV.

Figure 1:
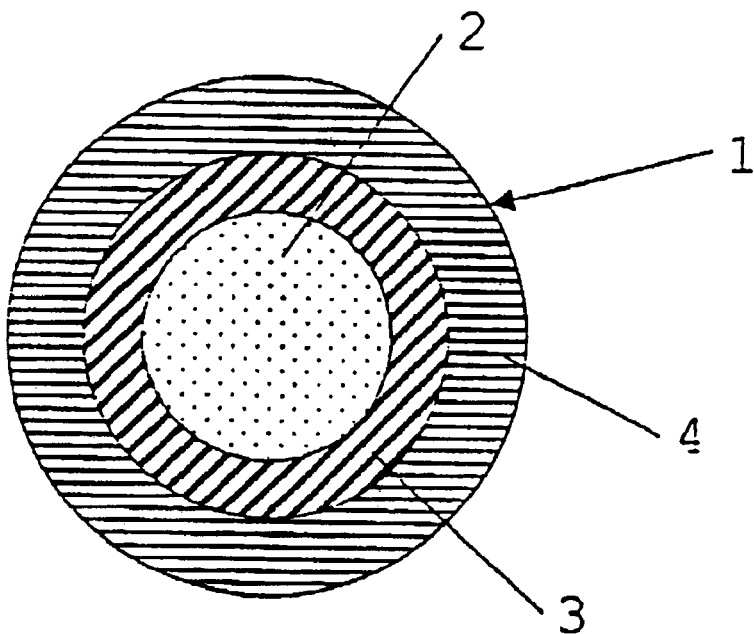
FIG. 1 is a cross-section of a low voltage cable of the unipolar type according to the invention.

With reference to FIG. 1, a self-extinguishing cable (1) of the unipolar type, in particular for low voltage electric energy distribution, comprises: a conductor (2), an inner layer having electric insulating function (3) and an outer layer (4) having the function of a protective sheath with flame retardant properties consisting of the composition according to the present invention.

The inner layer (3) can be made of a polymer material, either cross-linked or non cross-linked, preferably free from halogens, having common electric isolation properties. The polymer material can be selected, for instance, from: polyolefins, (omopolymers or copolymers of different olefins), copolymers olefins/ethylene insaturated esters, polyesters, polyethers, copolymers polyethers/polyesters, and mixtures thereof. Examples of such polymers are: polyethylene (PE), particularly linear low density PE (LLDPE); polypropylene (PP); thermoplastic copolymers propylene/ethylene; elastomeric copolymers ethylene-propylene (EPR) or ethylene-propylene-diene (EPDM); copolymers ethylene/vinylacetate (EVA); copolymers ethylene/methylacrylate (EMA); copolymers ethylene/ethylacrylate (EEA); copolymers ethylene/butyl-acrylate (EBA); copolymers ethylene/alpha-olefin, and the like.

Figure 2:
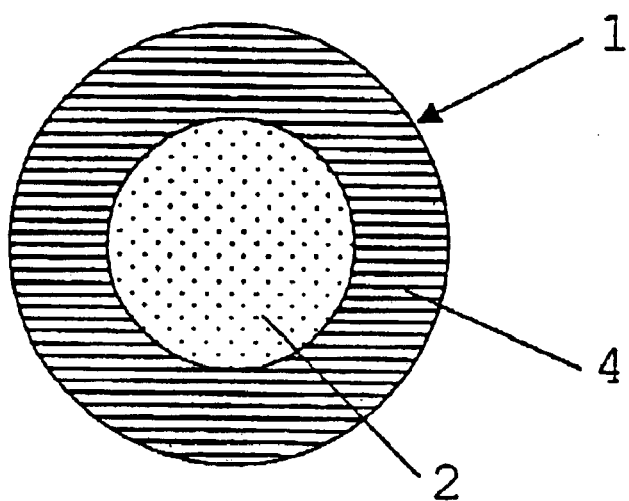
FIG. 2 is a cross-section of another low voltage cable of the unipolar type according to the invention.

Alternatively, referring to FIG. 2, a self-extinguishing cable (1) of the unipolar type, particularly for the distribution of low voltage electric energy, can be made of a conductor (2) directly coated with the anti-flame composition above described so as to form an outer layer (4) having flame retardant properties, without interposing other insulating layers. In this way, the outer layer (4) works also as electric insulation layer.

A thin polymer layer (not shown in the figures) having an antiabrasive function may also be externally applied.

A pigment may be added to the material forming the outer layer (4) or the antiabrasive layer aiming at giving the cable a specific colouring for identification purposes. Alternatively, the cable can be identified by a thin coloured strip which is applied externally.

Figure 3:
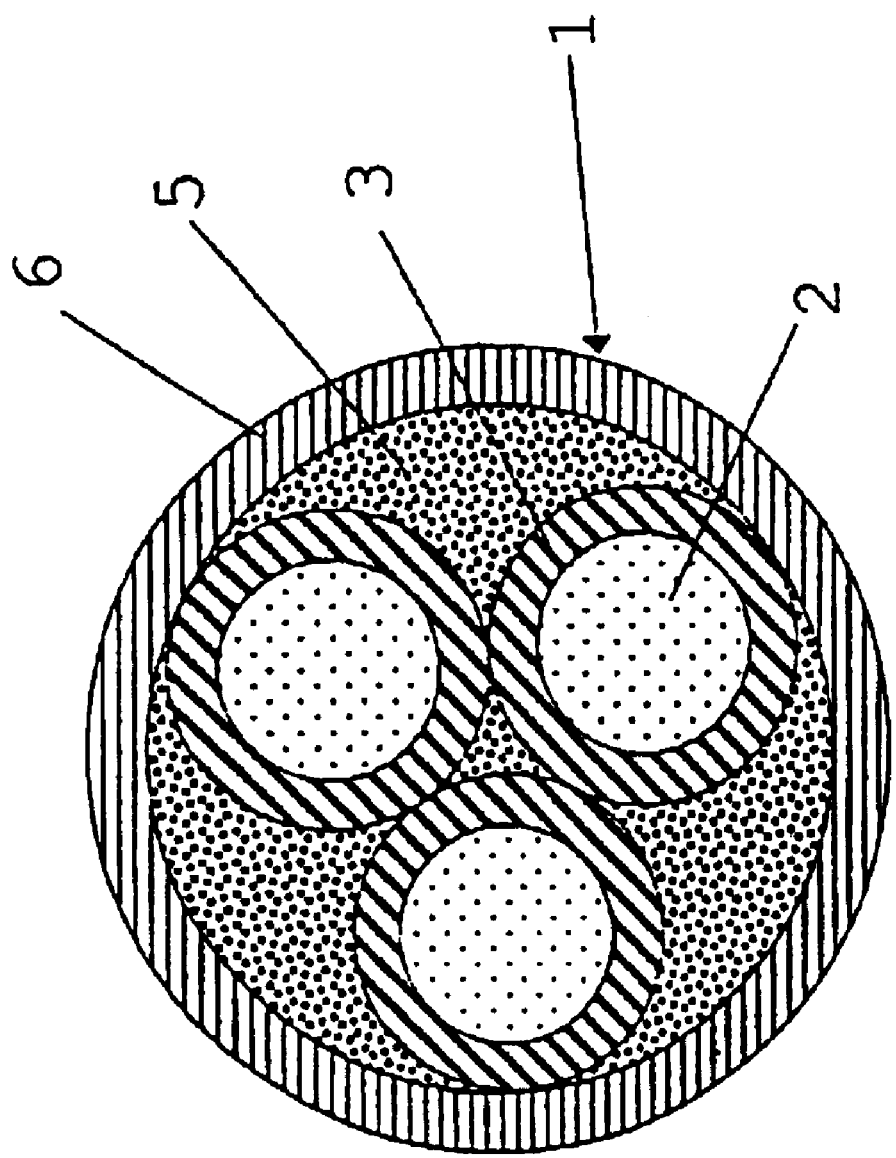
FIG. 3 is a cross-section of a low voltage cable of the tripolar type according to the invention.

With reference to FIG. 3, a self-extinguishing cable (1) of the tripolar type, in particular for the distribution of low voltage electric energy, comprises three conductors (2), each one coated with an insulating layer (3), two of which being the phase conductors, one being the neutral conductor. The insulating layers (3) may consist of an insulating polymer material selected from the ones above indicated. Alternatively, the insulating layers (3) may consist of a common flame retardant composition, or even of a flame retardant composition according to the present invention. The so insulated three conductors (2) are stranded together and the interstices among one conductor and the other are filled with a material (5), preferably having flame retardant properties as well, so as to form a continuous structure having a substantially cylindrical form. An external sheath (6) comprising the flame retardant composition according to the invention is then applied on such a structure. FIGS. 1–3 show only one possible embodiment of a cable according to the invention. It is evident that suitable modifications known in the art can be made in this embodiment, but without going beyond the scope of the invention. In particular, the flame retardant compositions of the invention can also be advantageously used for coating telecommunications cables, that is for data transmission, including optical fibre cables, or even mixed energy/telecommunications cables.

The following examples illustrate the invention without limiting it.

EXAMPLES

The compositions reported in the following table (examples 1–14) were prepared by inserting the various ingredients in a Pomini inner mixer of 1,2 l volume. After bringing the temperature to 150° C. and subsequent cooling, the mixer was emptied and the so obtained compositions were divided in small cubes having 3 mm diameter.

The resulting compositions were used for preparing the insulating layer of a copper conductor. This operation was carried out in an extruder having a cylinder of 45 mm diameter and a L/D (length/diameter) ratio of 25. The extruder has three warming/cooling zones along its body and one zone for its head. The head of the extruder was brought to a temperature of 150° C.

The compounds obtained with the examples of the following table were subject to the test based on standard IEC 332-1 (or CEI 20-35 or EN 50265 p.1 and p.2.1) adding the supplementary test of re-ignition which, substantially, consists in re-igniting the combustion soon after the possible self-extinguishment, by re-applying the flame by means of the same bunsen used for the above-mentioned test. The test of re-ignition was repeated five times, since it was deemed unlikely that a higher number of combustions could happen in reality, considering as positive the samples able to undergo more than five subsequent combustions by self-extinguishing.

The standard cable used for such a test had a copper conductor having a 1 mm diameter and was coated with a layer comprising the obtained various compositions (examples 1–14) having 0.7 mm thickness.

The test provides the application on the cable, for one minute, of the flame of a bunsen having a potency of 1 KW on the base of the vertically hanging cable. After the specified time has passed the Bunsen is removed and the possible self-extinguishment of the flame is detected.

After the possible self-extinguishment of the cable, the flame is re-ignited with the bunsen for about 10 seconds, repeating this operation for five times.

The values shown in the following table, at the entry "re-ignition", indicate the number of the re-ignitions (from 1 to 5) after which the self-extinguishment of the flame is detected, i.e. the number of the applications, after the first one, wherein the cable is self-extinguished.

For statistics purposes, the test was repeated five times, for each type of sample, and the single values shown in the table are actually the average of the values measured during the five tests.

As a further evidence of the properties of the cable of the invention, the composition of example 12 was also used in the test laid down by the standard IEC 332/3 category C, which provides carrying out the test on a vertically positioned bundle of cables.

The cables were cut in pieces of 3.5 m length, placed on a ladder and brought one near to the other until a space of 300 mm was occupied. The number of pieces was such that 1.5 l per meter of the bundle of cables of combustible material was involved in the test. More than 400 cable pieces were necessary for the standard cable having a conductor with a 1 mm diameter and 0.7 mm insulating layer thickness. The cable pieces in excess, with respect to the ones positioned on the 300 mm, were mounted on subsequent layers till the needed number of cable pieces was mounted.

The ladder was vertically positioned in a booth specified by the standard IEC 332/3 and fire was ignited with a burner having 700.000 Btu/hour potency. The flame was maintained for 20 minutes and then extinguished. In order for the test to be considered as positive, the length of the burned section shall not be longer than 2 m: the cable coated with the composition of example 12 was burned for 1,3 m, thus resulting to be suitable.

| MATERIALS | CHARACTERISTICS | DENSITY | 1 cfr | 2 cfr | 3 cfr | 4 cfr | 5 cfr | 6 cfr | 7cfr |
|---|---|---|---|---|---|---|---|---|---|
| Escorene UL 00119 (phr) | EVA 19% MFI = 0.7 (EXXON) | 0.950 | 100 | 100 | 100 | 100 | 100 | 100 | 100 |
| Melamine MP (phr) | melamine phosphate (P:13.8%-N:37.5%)(DSM) | 1.570 | 15 | | 15 | 15 | 7.5 | | |
| | melamine | | | | | | | | 15 |
| Zeolite 4A (phr) | zeolite 4A in powder (CHEM PLAST) | 1.000 | | | | 1.5 | 1.5 | 1.5 | 1.5 |
| Masteret 40470* (phr) | 68% P in EVA (ITALMATCH) | 1.540 | | 15 | 15 | 15 | 7.5 | | |
| Hydrofy G2.5 (phr) | magnesium hydroxide (Nuova Sima) | 2.360 | 60 | 60 | | | | 60 | |
| Density (kg/dmc): | | | 1.248 | 1.246 | 1.044 | 1.043 | 1.001 | 1.222 | 1.047 |
| Flame Test (IEC 332/1) | | | 0/5 | 0/5 | 2/5 | 2/5 | 0/5 | 0/5 | 0/5 |
| Re-ignition total fire (n° appl.) | | | n.d. | n.d. | 1 | 1 | n.d. | n.d. | n.d. |
| | MATERIALS | | 8 cfr | 9 cfr | 10 cfr | 11 cfr | 12 | 13 | 14 |
| | Escorene UL 00119 (phr) | | 100 | 100 | 100 | 100 | 100 | 100 | 100 |
| | Melamine MP (phr) | | | | 15 | 15 | 15 | 5 | 10 |
| | Zeolite 4A (phr) | | | | | | 1.5 | 1.5 | 1.5 |
| | Masteret 40470* (phr) | | | | 15 | 15 | 15 | 5 | 10 |
| | Hydrofy G2.5 (phr) | | 60 | 90 | 60 | 90 | 60 | 60 | 60 |
| | Density (kg/dmc): | | 1.222 | 1.325 | 1.267 | 1.352 | 1.264 | 1.237 | 1.251 |
| | Flame Test (IEC 332/1) | | 0/5 | 0/5 | 5/5 | 5/5 | 5/5 | 5/5 | 5/5 |
| | Re-ignition total fire (n° appl.) | | n.d. | n.d. | 3 | 3 | 5 | 5 | 5 |

MFI = Melt Flow Index; n.d. = non detectable; cfr = comparison;
*the reported values indicate the content of the phosphorus in phr.

What is claimed is:

1. A self-extinguishing cable, comprising:

at least one conductor; and at least one coating layer;

wherein the at least one coating layer comprises a fire-retardant composition, and wherein the fire-retardant composition comprises:
 a polymer based material;
 melamine or a derivative of melamine;
 red phosphorus;
 magnesium hydroxide or hydrated oxide, aluminum hydroxide or hydrated oxide, or magnesium hydroxide or hydrated oxide and aluminum hydroxide or hydrated oxide; and
 zeolite;

wherein the melamine or derivative of melamine comprises amounts greater than or equal to 5 parts-by-weight and less than or equal to 50 parts-by-weight, wherein the red phosphorus comprises amounts greater than or equal to 5 parts-by-weight and less than or equal to 50 parts-by-weight, wherein the magnesium hydroxide or hydrated oxide, aluminum hydroxide or hydrated oxide, or magnesium hydroxide or hydrated oxide and aluminum hydroxide or hydrated oxide comprise amounts greater than or equal to 10 parts-by-weight and less than or equal to 150 parts-by-weight, wherein the zeolite comprises amounts greater than or equal to 1 part-by-weight and less than or equal to 5 parts-by-weight, and wherein the amounts are referenced to 100 parts-by-weight of the polymer base material.

2. The cable of claim 1, wherein the polymer base material comprises one or more:

polyolefins;

copolymers of olefins;

copolymers of olefins with esters comprising ethylene unsaturation;

polyesters;

polyethers, and/or copolymers of polyether/polyester.

3. The cable of claim 1, wherein the polymer base material comprises one or more:

high-density polyethylenes;

medium-density polyethylenes;

low-density polyethylenes; and/or copolymers of ethylene with alpha-olefins comprising greater than or equal to 3 carbon atoms and less than or equal to 12 carbon atoms.

4. The cable of claim 1, wherein the polymer base material comprises one or more:
polypropylenes;
thermoplastic copolymers of propylene with ethylene or another olefin;
copolymers of ethylene with at least one liter selected from alkylacrylates, alkylmetacrylates, and vinylcarboxylates; and/or
elastomeric copolymers of ethylene/alpha-olefins;
wherein, for the alkylacrylates and/or alkylmetacrylates, an alkyl group, linear or branched, comprises greater than or equal to 1 carbon atom and less than or equal to 8 carbon atoms, and/or
wherein, for the vinylcarboxylates, a carboxyl group, liner or branched, comprises greater than or equal to 2 carbon atoms and less than or equal to 8 carbon atoms.

5. The cable of claim 4, wherein the copolymers of ethylene with at least one ester are copolymers of:
ethylene/vinylacetate;
ethylene/ethylacrylate; and/or
ethylene/butylacrylate.

6. The cable of claim 1, wherein the derivative of melamine is:
a guanamine;
a melamine phosphate;
a borate;
a sulphate; or
a cyanurate.

7. The cable of claim 1, wherein the zeolite formula is:

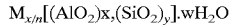

$M_{x/n}[(AlO_2)x,(SiO_2)y].wH_2O$ wherein M represents an alkali or earth-alkali metal cation or tetralkylammonium,
wherein w, x, and y are integers,
wherein a ratio of y to x is greater than or equal to 1:1, and
wherein n is a cation valence.

8. The cable of claim 1, wherein the melamine or derivative of melamine comprises amounts greater than or equal to 10 parts-by-weight and less than or equal to 30 parts-by-weight.

9. The cable of claim 1, wherein the red phosphorus comprises amounts greater than or equal to 10 parts-by-weight and less than or equal to 30 parts-by-weight.

10. The cable of claim 1, wherein the magnesium hydroxide or hydrated oxide, aluminum hydroxide or hydrated oxide, or magnesium hydroxide or hydrated oxide and aluminum hydroxide or hydrated oxide comprises amounts greater than or equal to 20 parts-by-weight and less than or equal to 100 parts-by-weight.

11. The cable of claim 1, wherein the zeolite comprises amounts greater than or equal to 1.5 parts-by-weight and less than or equal to 3 parts-by-weight.

12. The cable of claim 1, wherein the melamine or derivative of melamine comprises amounts greater than or equal to 10 parts-by-weight and less than or equal to 30 parts-by-weight,
wherein the red phosphorus comprises amounts greater than or equal to 10 parts-by-weight and less than or equal to 30 parts-by-weight,
wherein the magnesium hydroxide or hydrated oxide, aluminum hydroxide or hydrated oxide, or magnesium hydroxide or hydrated oxide and aluminum hydroxide or hydrated oxide comprises amounts greater than or equal to 20 parts-by-weight and less than or equal to 100 parts-by-weight, and
wherein the zeolite comprises amounts greater than or equal to 1.5 parts-by-weight and less than or equal to 3 parts-by-weight.

13. A fire-retardant composition, comprising:
a base polymer composition, comprising:
a polymer base material;
melamine or a derivative of melamine;
red phosphorus;
magnesium hydroxide or hydrated oxide, aluminum hydroxide or hydrated oxide, or magnesium hydroxide or hydrated oxide and aluminum hydroxide or hydrated oxide; and
zeolite;
wherein the melamine or derivative of melamine comprises amounts greater than or equal to 5 parts-by-weight and less than or equal to 50 parts-by-weight,
wherein the red phosphorus comprises amounts greater than or equal to 5 parts-by-weight and less than or equal to 50 parts-by-weight,
wherein the magnesium hydroxide or hydrated oxide, aluminum hydroxide or hydrated oxide, or magnesium hydroxide or hydrated oxide and aluminum hydroxide or hydrated oxide comprises amounts greater than or equal to 10 parts-by-weight and less than or equal to 150 parts-by-weight,
wherein the zeolite comprises amounts greater than or equal to 1 part-by-weight and less than or equal to 5 parts-by-weight, and
wherein the amounts are referenced to 100 parts-by-weight of the polymer base material.

14. The composition of claim 13, wherein the polymer base material comprises one or more:
polyolefins;
copolymers of olefins;
copolymers of olefins with esters comprising ethylene unsaturation;
polyesters;
polyethers; and/or
copolymers of polyether/polyester.

15. The composition of claim 13, wherein the polymer base material comprises one or more:
high-density polyethylenes;
medium-density polyethylenes;
low-density polyethylenes; and/or
copolymers of ethylene with alpha-olefins comprising greater than or equal to 3 carbon atoms and less than or equal to 12 carbon atoms.

16. The composition of claim 13, wherein the polymer base material comprises one or more:
polypropylenes,
thermoplastic copolymers of propylene with ethylene or another olefin;
copolymers of ethylene with at least one ester selected from alkylacrylates, alkylmetacrylates, and vinylcarboxylates; and/or
elastomeric copolymers of ethylene/alpha-olefins;
wherein, for the alkylacrylates and/or alkylmetacrylates, an alkyl group, linear or branched, comprises greater than or equal to 1 carbon atom and less than or equal to 8 carbon atoms, and/or wherein, for the vinylcarboxylates, a carboxyl group, linear or branched, comprises greater than or equal to 2 carbon atoms and less than or equal to 8 carbon atoms.

17. The composition of claim 16, wherein the copolymers of ethylene with at least one ester are copolymers of:

ethylene/vinylacetate;

ethylene/ethylacrylate; and/or ethylene/butylacrylate.

18. The composition of claim 13, wherein the derivative of melamine is:

a guanamine;

a melamine phosphate;

a borate;

a sulphate; or a cyanurate.

19. The composition of claim 13, wherein the zeolite formula is:

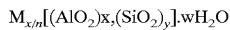

$M_{x/n}[(AlO_2)_x(SiO_2)_y] \cdot wH_2O$ wherein M represents an alkali or earth-alkali metal cation or tetralkylammonium, wherein w, x, and y are integers, wherein a ratio of y to x is greater than or equal to 1:1, and wherein n is a cation valence.

20. The composition of claim 13, wherein the melamine or derivative of melamine comprises amounts greater than or equal to 10 parts-by-weight and less than or equal to 30 parts-by-weight.

21. The composition of claim 13, wherein the red phosphorus comprises amounts greater than or equal to 10 parts-by-weight and less than or equal to 30 parts-by-weight.

22. The composition of claim 13, wherein the magnesium hydroxide or hydrated oxide, aluminum hydroxide or hydrated oxide, or magnesium hydroxide or hydrated oxide and aluminum hydroxide or hydrated oxide comprises amounts greater than or equal to 20 parts-by-weight and less than or equal to 100 parts-by-weight.

23. The composition of claim 13, wherein the zeolite comprises amounts greater than or equal to 1.5 parts-by-weight and less than or equal to 3 parts-by-weight.

24. The composition of claim 13, wherein the melamine or derivative of melamine comprises amounts greater than or equal to 10 parts-by-weight and less than or equal to 30 parts-by-weight, wherein the red phosphorus comprises amounts greater than or equal to 10 parts-by-weight and less than or equal to 30 parts-by-weight, wherein the magnesium hydroxide or hydrated oxide, aluminum hydroxide or hydrated oxide, or magnesium hydroxide or hydrated oxide and aluminum hydroxide or hydrated oxide comprises amounts greater than or equal to 20 parts-by-weight and less than or equal to 100 parts-by-weight, and wherein the zeolite comprises amounts greater than or equal to 1.5 parts-by-weight and less than or equal to 3 parts-by-weight.

* * * * *

UNITED STATES PATENT AND TRADEMARK OFFICE
CERTIFICATE OF CORRECTION

PATENT NO. : 6,797,200 B2
DATED : September 28, 2004
INVENTOR(S) : Cristiana Scelza et al.

It is certified that error appears in the above-identified patent and that said Letters Patent is hereby corrected as shown below:

Title page,
Item [54], Title, "FIRE RETARDANT" should read -- FIRE-RETARDANT --; and after "COMPOSITION", delete "USED THEREIN".

Column 7,
Line 56, "based" should read -- base --.

Column 8,
Line 7, "comprise" should read -- comprises --.

Column 9,
Line 9, "liter" should read -- ester --.
Line 18, "liner" should read -- linear --.
Line 36, "$M_{x/n}[(AlO_2)x,(SiO_2)_y].wH_2O$" should read -- $M_{x/n}[(AlO_2)_x,(SiO_2)_y]\cdot wH_2O$ --.

Column 11,
Line 21, "$M_{x/n}[(AlO_2)x,(SiO_2)_y].wH_2O$" should read -- $M_{x/n}[(AlO_2)_x,(SiO_2)_y]\cdot wH_2O$ --.

Signed and Sealed this

Tenth Day of May, 2005

JON W. DUDAS
*Director of the United States Patent and Trademark Office*